United States Patent
Ji et al.

(10) Patent No.: US 10,131,549 B2
(45) Date of Patent: Nov. 20, 2018

(54) REMOTE MANAGED BALLAST WATER TREATMENT SYSTEM USING AUGMENTED REALITY

(71) Applicant: HANLA IMS Co., Ltd., Busan (KR)

(72) Inventors: Suk Joon Ji, Busan (KR); Young Gu Kim, Busan (KR); In Tae Cho, Busan (KR); Woo Jin Choi, Gyeongsangnam-do (KR); Kwang Seob Lee, Busan (KR); Chae Ho Lee, Busan (KR); Chang Kook Kim, Busan (KR)

(73) Assignee: HANLA IMS CO., LTD., Busan (KR)

( * ) Notice: Subject to any disclaimer, the term of this patent is extended or adjusted under 35 U.S.C. 154(b) by 277 days.

(21) Appl. No.: 14/890,134

(22) PCT Filed: Aug. 19, 2014

(86) PCT No.: PCT/KR2014/007686
§ 371 (c)(1),
(2) Date: Nov. 9, 2015

(87) PCT Pub. No.: WO2015/088124
PCT Pub. Date: Jun. 18, 2015

(65) Prior Publication Data
US 2016/0176724 A1    Jun. 23, 2016

(30) Foreign Application Priority Data

Dec. 12, 2013 (KR) .................. 10-2013-0154431

(51) Int. Cl.
*G06T 19/00* (2011.01)
*C02F 1/00* (2006.01)
(Continued)

(52) U.S. Cl.
CPC .............. *C02F 1/008* (2013.01); *B63J 4/00* (2013.01); *G05B 15/02* (2013.01); *G06Q 10/06* (2013.01);
(Continued)

(58) Field of Classification Search
CPC ..................................... G06T 19/006
(Continued)

(56) References Cited

U.S. PATENT DOCUMENTS

| | | | |
|---|---|---|---|
| 9,024,972 B1* | 5/2015 | Bronder | G06T 19/006 345/633 |
| 2015/0081227 A1* | 3/2015 | Fukuzawa | C02F 1/008 702/25 |

(Continued)

FOREIGN PATENT DOCUMENTS

KR   10-2010-0107097 A    10/2010
KR   10-2011-0114931 A    10/2011
(Continued)

OTHER PUBLICATIONS

International Search Report issued in PCT/KR2014/007686 dated Dec. 5, 2014 (2 pages).

(Continued)

*Primary Examiner* — Son Mai
(74) *Attorney, Agent, or Firm* — Envision USA Inc.

(57) ABSTRACT

The present invention relates to a remote managed ballast water treatment system using augmented reality, in particular, a ballast water treatment system (hereinafter, referred to as "BWTS") which receives operation and failure information from various sensors installed in each component within a device, the remote managed ballast water treatment system comprising: an augmented reality terminal having a software application installed therein, which can recognize each com- (Continued)

ponent of the BWTS through shape information in a shot image while shooting a real-time image and provides information on a state of the BWTS and information required for the BWTS (provides augmented reality information), through a computer graphic image, in addition to a real-time image of reality; an augmented reality maintenance apparatus for the BWTS, the apparatus comprising a BWTS interface, an augmented reality interface, a satellite communication interface, and a control unit; and a remote management system of a terrestrial base station which shares sensing information of the BWTS and real-time image information of the augmented reality terminal with satellite communication through the satellite communication interface, wherein, when BWTS maintenance information has been sent from the remote management system of the terrestrial base station during a BWTS failure, the control unit outputs a failure point and repair information as augmented reality image information to the augmented reality terminal, a failure treatment method is guided to a user as a real-time augmented reality image, and the terrestrial base station supervises a failure treatment process of the BWTS through a real-time image.

5 Claims, 6 Drawing Sheets

(51) Int. Cl.
*G06Q 10/06* (2012.01)
*G05B 15/02* (2006.01)
*B63J 4/00* (2006.01)
*C02F 103/00* (2006.01)

(52) U.S. Cl.
CPC ...... *G06T 19/006* (2013.01); *C02F 2103/008* (2013.01); *C02F 2209/008* (2013.01); *G05B 2219/32014* (2013.01)

(58) Field of Classification Search
USPC .......................................................... 345/633
See application file for complete search history.

(56) References Cited

U.S. PATENT DOCUMENTS

2016/0280352 A1* 9/2016 Ji ........................... G06Q 50/10
2017/0322119 A1* 11/2017 Da Silva ............... G01M 99/00

FOREIGN PATENT DOCUMENTS

KR     1020110117492 A     10/2011
KR     1020120015802 A     2/2012
KR     10-2013-0080957 A     7/2013

OTHER PUBLICATIONS

Written Opinion of the International Searching Authority issued in PCT/KR2014/007686 dated Dec. 5, 2014 (4 pages).

* cited by examiner

REMOTE MANAGED BALLAST WATER TREATMENT SYSTEM USING AUGMENTED REALITY

BACKGROUND OF THE INVENTION

Field of the Invention

The present invention relates to a remote managed ballast water treatment system using augmented reality in a ballast water treatment system (hereinafter, referred to as "BWTS") which receives operation and failure information from various sensors installed in each component within a device, the remote managed ballast water treatment system comprising; an augmented reality terminal having a software application installed therein, which can recognize each component of the BWTS through shape information in a shot image while shooting a real-time image and provides information on a state of the BWTS and information required for the BWTS (provides augmented reality information), through a computer graphic image, in addition to a real-time image of reality; an augmented reality maintenance apparatus for the BWTS, the apparatus comprising a BWTS interface, an augmented reality interface, a satellite communication interface, and a control unit; wherein the BWTS interface which receives operation and failure information of the BWTS from various sensors installed in the BWTS; the augmented reality interface which receives real-time image information from the augmented reality terminal or outputs the real-time image information to the augmented reality terminal; the satellite communication interface connected to an external satellite communication device to perform transmission/reception with a remote terrestrial base station; and the control unit which calculates information input through the BWTS interface, the augmented reality interface, and the satellite communication interface to output the calculated information; and a remote management system of a terrestrial base station which shares sensing information of the BWTS and real-time image information of the augmented reality terminal with satellite communication through the satellite communication interface, wherein, when BWTS maintenance information has been sent from the remote management system of the terrestrial base station during a BWTS failure, the control unit outputs a failure point and repair information as augmented reality image information to the augmented reality terminal, a failure treatment method is guided to a user as a real-time augmented reality image, and the terrestrial base station supervises a failure treatment process of the BWTS through a real-time image.

Related Art

An augmented reality is a technology of showing a real world viewed by a user's eyes to overlap with a virtual object, and has been recently spotlighted in addition to the development of a head up display (HUD) such as Google glass.

Since the augmented reality shows one image by mixing a virtual world having additional information with a real world in real time, the augmented reality refers to a mixed reality (MR).

The augmented reality is a concept for complementing the real world to the virtual world, uses a virtual environment created by computer graphics, and a leading part is a real environment. The computer graphics serves to additionally provide information necessary for the real environment.

When using augmented reality techniques, the user receives the real environment together with information of a virtual screen by overlapping a three-dimensional virtual image with real image.

The virtual reality technique makes the user to be immersed in a virtual environment so that the user cannot see a real environment. However, augmented reality technology in the real world and the virtual object are mixed with to provide better realism and additional information by allowing the user to view the real environment.

As example of a technology using the above augmented reality, as described in Korean patent application No. 10-2010-0036986, entitled "Augmented Remote Controller and Method of Operating the Same" and Korean patent application No. 10-2010-0078239, entitled "SYSTEM AND METHOD FOR MANAGING VEHICLE PARTS USING AUGMENTED REALITY", to provide a manual with respect to a use method of a product to the user in an augmented reality is getting the spotlighted.

Meanwhile, a ballast water treatment system (BWTS) is a device for controlling ballast water filled in a ballast tank of a ship.

The ballast water filled in the ballast tank of the ship includes various marine creatures and pathogens. When marine creatures or pathogens in a specific sea area are introduced into another sea area so that adverse reaction disturbing an environment and an ecosystem is caused.

Accordingly, International maritime organization (IMO) performs a procedure of purifying and sterilizing the marine creatures or the pathogens in the ballast water when the ballast water is introduced and discharged. The IMO legislates strict agreement of regulations including prohibition of arrival of a ship in port when the reference is not satisfied.

A BWTS is necessarily installed in the ship. A ship operator does not have a professional technical knowledge with respect to the BWTS. An operation of the BWTS is performed on the sea, while the technical expert with respect to the BWTS is located at a remote land away from the ship.

That is, the operation of the BWTS is essential performed on the sea. Upon accident or failure of the BWTS, it is impossible to rapidly deal with the accident or failure of the BWTS due to non-professional knowledge of the ship operator.

Further, since a new ship ensures a predetermined space capable of installing the BWTS to be configured in one package form as shown in FIG. 2, a predetermined part may be managed through a manual provided from the ship operator. Existing running 100,000 ships including the BWTS according to a rule of the IMO do not include a dedicated space. Accordingly, since the running ships are decomposed in different forms according to a structural form of the ship, it is difficult even for the skilled expert to maintain the ship.

BWTS accident on the sea needs a rapid deal. However, it is not rational to run the ship while boarding an expert to the BWTS in each ship. There is a need for a scheme for solving the above problem.

SUMMARY OF THE INVENTION

The present invention provides a remote managed ballast water treatment system using augmented reality capable of significantly reducing maintenance and failure repair cost and ensuring the system life and reliability since a non-expert of marine BWTS rapidly deals with failure repair of the BWTS like a land expert using an augmented reality technique.

In accordance with another aspect of the present invention, there is provided remote managed ballast water treatment system using augmented reality, a ballast water treatment system (hereinafter, referred to as "BWTS") which receives operation and failure information from various sensors installed in each component within a device, the remote managed ballast water treatment system including; an augmented reality terminal having a software application installed therein, which can recognize each component of the BWTS through shape information in a shot image while shooting a real-time image and provides information on a state of the BWTS and information required for the BWTS (provides augmented reality information), through a computer graphic image, in addition to a real-time image of reality; an augmented reality maintenance apparatus for the BWTS, the apparatus comprising a BWTS interface, an augmented reality interface, a satellite communication interface, and a control unit; wherein the BWTS interface which receives operation and failure information of the BWTS from various sensors installed in the BWTS; the augmented reality interface which receives real-time image information from the augmented reality terminal or outputs the real-time image information to the augmented reality terminal; the satellite communication interface connected to an external satellite communication device to perform transmission/reception with a remote terrestrial base station; and the control unit which calculates information input through the BWTS interface, the augmented reality interface, and the satellite communication interface to output the calculated information; and a remote management system of a terrestrial base station which shares sensing information of the BWTS and real-time image information of the augmented reality terminal with satellite communication through the satellite communication interface, wherein, when BWTS maintenance information has been sent from the remote management system of the terrestrial base station during a BWTS failure, the control unit outputs a failure point and repair information as augmented reality image information to the augmented reality terminal, a failure treatment method is guided to a user as a real-time augmented reality image, and the terrestrial base station supervises a failure treatment process of the BWTS through a real-time image.

A marker or a bar code may be attached to each part of the BWTS that the augmented reality terminal recognizes while photographing a real-time image, and the augmented reality terminal may recognize shapes of the parts of the BWTS and an output position of a processed computer graphic image by the marker or the bar code.

The augmented reality terminal may include a smart phone or a head up device (HUD) including a software application for additionally providing a computer graphic virtual image to a real-time image of a real environment.

The control unit may include a memory for storing a failure processing manual with respect to various sensing signals input from the BWTS as augmented reality image information and guides general failure processing of the BWTS to be soon realized as augmented reality.

The remote management system of the terrestrial base station may include a program for diagnosing state information of the BWTS received from a satellite network to determine whether or not the remote management system is normal and to diagnose and estimate a failure of the BWTS to monitor the state information of the BWTS in real time, and outputs a maintenance command of the BWTS or a maintenance operation command of the BWTS when the failure of the BWTS is estimated through an augmented reality interface.

Advantageous Effects

The present invention can provide a remote managed ballast water treatment system using augmented reality capable of significantly reducing maintenance and failure repair cost and ensuring the system life and reliability since a non-expert of marine BWTS rapidly deals with failure repair of the BWTS like a land expert using an augmented reality technique.

DESCRIPTION OF REFERENCE NUMERAL

Figure 1:
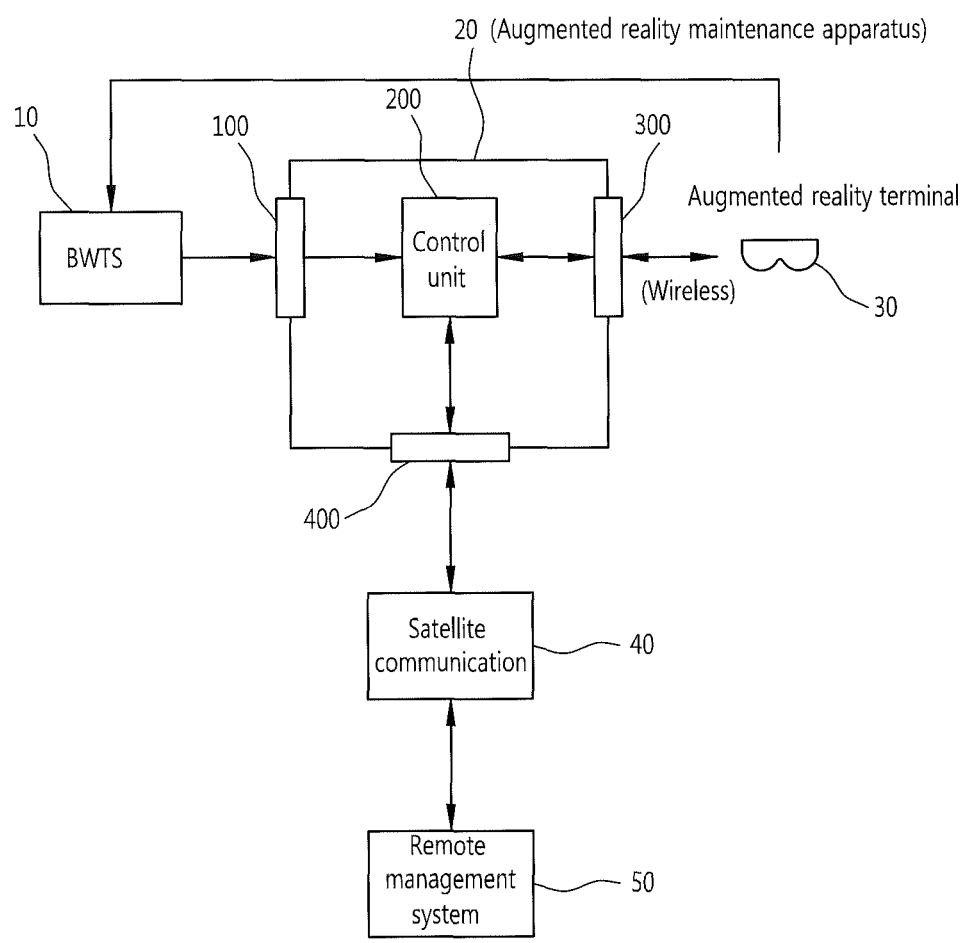
FIG. 1 is a block diagram illustrating a configuration of the present invention.

10: BWTS
20: Augmented reality maintenance apparatus for BWTS
30: Augmented reality terminal 40: Satellite communication device
50: Remote management system
100: BWTS interface 300: Augmented reality interface
400: Satellite communication interface

DESCRIPTION OF EXEMPLARY EMBODIMENTS

The above objects, features, and advantages can be more clearly comprehended through the following description in relation to accompanying drawings. Accordingly, those skilled in the art can easily realize the present inventive concept. In the following description, if detailed description about well-known functions or configurations may make the subject matter of the disclosure unclear, the detailed description will be omitted.

Terms and words used in the specification and the claims shall not be interpreted as commonly-used dictionary meanings, but shall be interpreted as to be relevant to the technical scope of the invention based on the fact that the inventor may define the concept of the terms to explain the invention in best ways.

Figure 2:
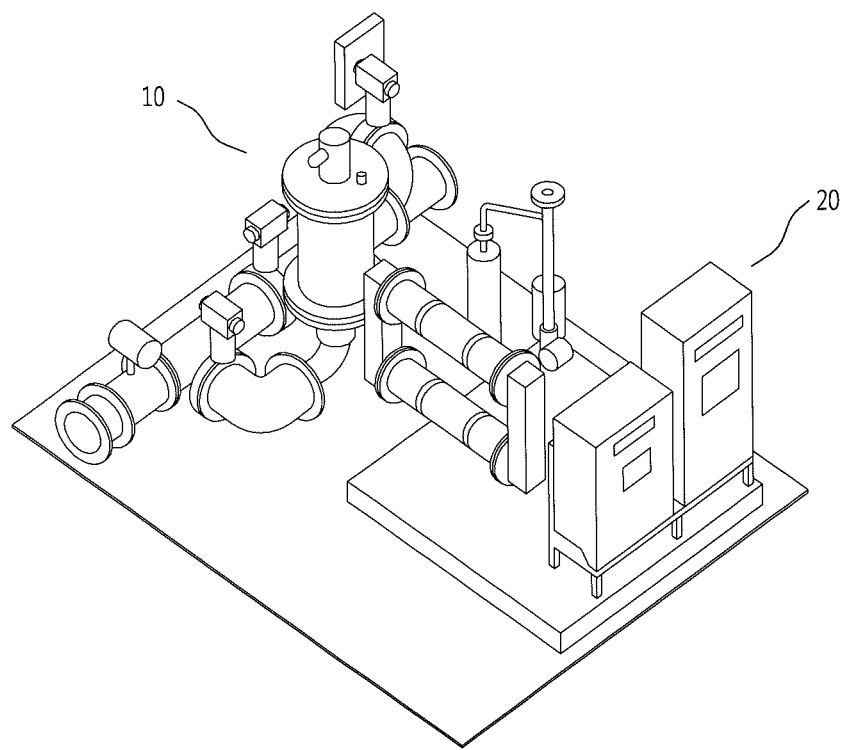
FIG. 2 is a perspective view illustrating a configuration of the present invention.
Figure 3:
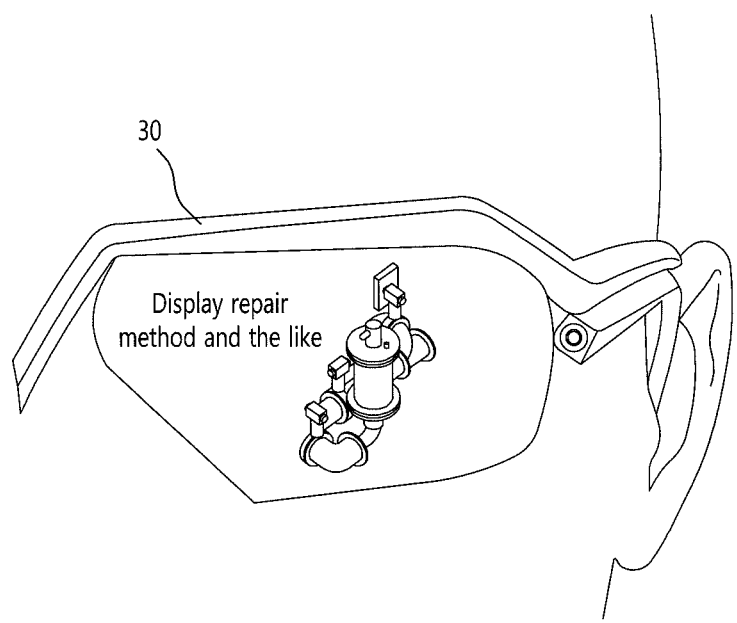
FIG. 3 and FIG. 4 are exemplary diagrams illustrating an augmented reality terminal according to the present invention.
Figure 4:
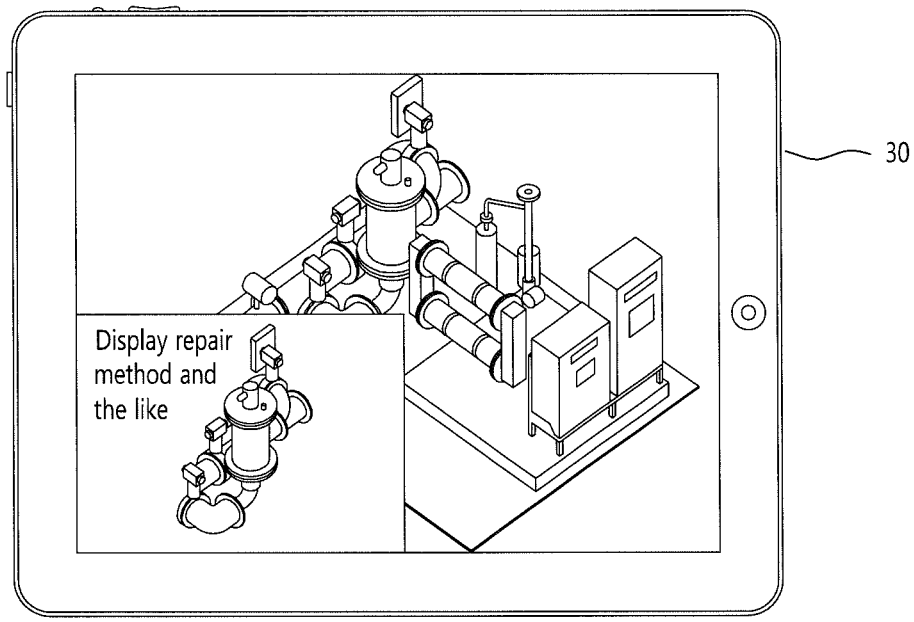
Figure 5:
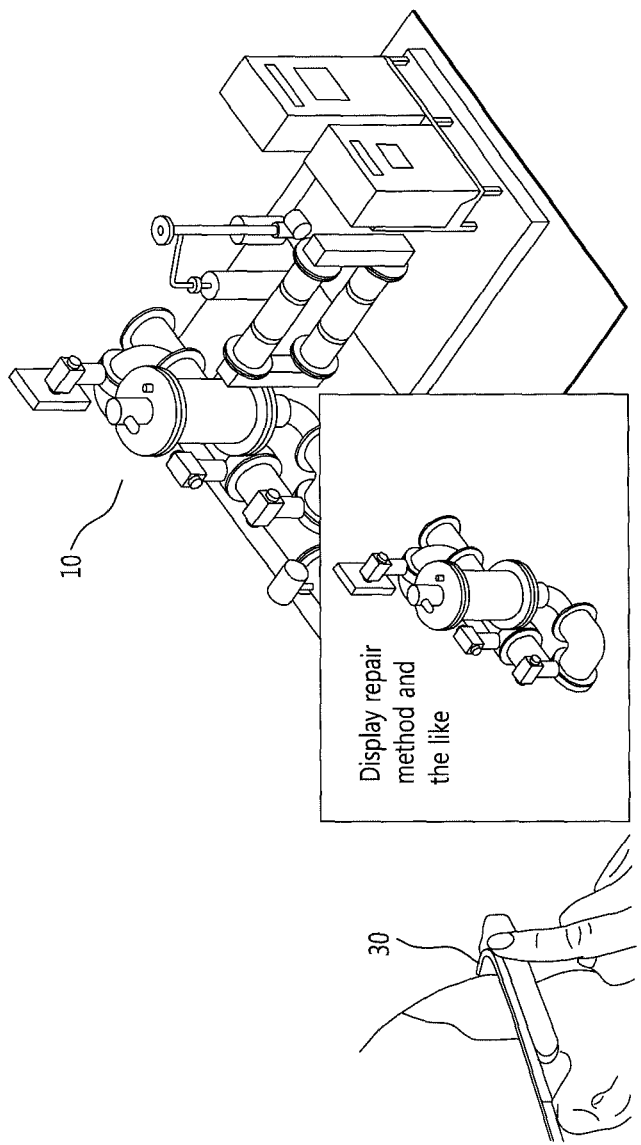
FIG. 5 is a diagram illustrating an implementation of the present invention.
Figure 6:
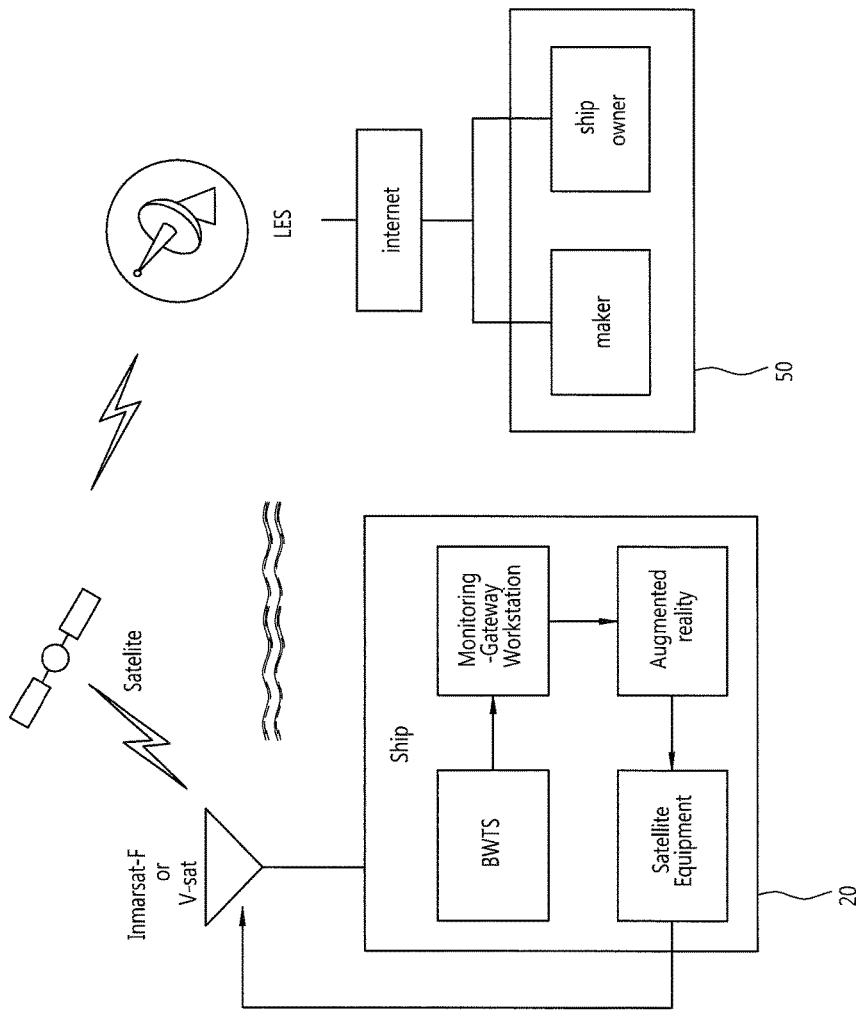
FIG. 6 is a block diagram illustrating a block diagram illustrating the whole flow according to the present invention.

FIG. 1 is a block diagram illustrating a configuration of the present invention. FIG. 2 is a perspective view illustrating a configuration of the present invention. FIG. 3 and FIG. 4 are exemplary diagrams illustrating an augmented reality terminal according to the present invention. FIG. 5 is a diagram illustrating an implementation of the present invention. FIG. 6 is a block diagram illustrating a block diagram illustrating the whole flow according to the present invention.

As shown in drawings, the present invention relates to an augmented reality maintenance apparatus 20 for a BWTS 10 installed in the BWTS 10 and an augmented reality terminal 30. The augmented reality maintenance apparatus 20 for a BWTS 10 includes a BWTS interface 100, a control unit 200, an augmented reality interface 300, and a satellite communication interface 400. The augmented reality maintenance apparatus 20 for the BWTS 10 is operated in connection with a remote management system 50 through the augmented reality terminal 30 and a satellite communication device 40.

Various sensors are installed in components of the BWTS 10, respectively, in order to monitor a normal operation state.

In general, when the BWTS 10 fails, a failure point and reason are detected through alarm information of the sensors so that a device is repaired.

Therefore, the acquisition and analysis of the installation position and the sensing information of the sensors is well known for the art.

However, since the above acquisition and analysis of the sensors and troubleshooting through the above require a level of skilled professionals, An operator of the ship who is not experienced with respect to the BWTS 10 mounted inside a ship running the ocean, has a great difficulty in dealing with tasks when the maintenance or malfunction such as failure prediction or a failure diagnosis of the BWTS 10 occurs.

In order to solve the problem, the present invention relates to a system that acquires sensing information based on failure analysis and a remote support solution of failure repair of the remote management system through a satellite communication network, and acquires image information of the BWTS 10 through the augmented reality terminal 30, to output failure points and a treatment method of the BWTS 10 to the image information of the augmented reality terminal in a real time manner, so that a user recognizes the failure positions while viewing the BWTS 10 by the augmented reality terminal 20 and repairs the failure by detecting a sequential failure cause according to given information which allows an unskilled ship operator with respect to the BWTS 10 to easy maintain and manage the BWTS 10.

To this end, the present invention combines the augmented reality maintenance apparatus 20 for a BWTS 10 for acquiring and treating sensing information of the BWTS 10 with the BWTS 10 as shown in FIG. 1.

As shown in FIG. 2, the augmented reality maintenance apparatus 20 for a BWTS 10 may be installed inside the BWTS 10 or at an installation position of the BWTS 10 and may be operated in a ship network device such as can communication.

The augmented reality maintenance apparatus 20 for a BWTS 10 is coupled with the BWTS interface 100, the augmented reality interface 300, and the satellite communication interface 400 to exchange information with external devices.

The BWTS interface 100 receives and outputs sensing information from and to various sensors which are installed in the BWTS 10. The BWTS interface 100 is a device for stores (logs) and analyzes the sensing information to collect, store, and interpret the above so that the control unit may determine the operation and failure information of the BWTS 10.

The augmented reality interface 300 is a device for receiving the real-time image information from the augmented reality terminal 30 in the wireless communication, and outputting image information to the augmented reality terminal 30.

The augmented reality device 30 is a device for inputting/outputting a real-time image screen of the BWTS 10, a screen determining whether to fail, or a repair procedure photographed by a high-performance camera included in a smart phone or a smart pad as shown in FIG. 4 or a HUD such as a Google glass as shown in FIG. 3. The present invention analyzes the sensor information of the BWTS 10 input through the BWTS interface 100 to output the analyzed sensor information of the BWTS 10 together with the image of the augmented reality terminal 30.

Thus, the present invention is a device for overlapping a determination screen of presence of failure or a computer image graphic screen to show a repair procedure with a real-time image photographing screen to output the overlapping screen. Hereinafter, this is defined as augmented reality information.

Therefore, the augmented reality terminal according to the present invention may recognize respective components of the BWTS as shape information in a photographed image while photographing the real-time image. The augmented reality terminal embeds the software application for additionally providing information on a state of the BWTS and information necessary for the BWTS as the computer graphic image to a real-time image (providing the augmented reality information).

On the other hand, the augmented reality maintenance apparatus 20 for a BWTS 10 previously provides and stores augmented reality information (virtual image configured by computer graphics) to which the augmented reality terminal 30 will output to reduce burden load amount of the augmented reality terminal 30.

The augmented reality interface is preferably configured by a wireless communication apparatus for connecting the augmented reality maintenance apparatus for a BWTS 10 to the augmented reality terminal in a wireless scheme. The above wireless communication device may be a general technology to the smart device using the Wi-Fi.

On the other hand, the present invention attaches a marker or a bar coder which the augmented reality terminal may recognize while photographing the real-image in order to reduce a recognition error of the shape information in the images photographing the components of the BWTS 10 while photographing real-time image by the augmented reality terminal.

Accordingly, by the augmented reality terminal may correct the error while saving a time required to analyze a shape through image information.

Therefore, the augmented reality terminal includes the software to recognize shapes of respective components of the BWTS 10, to confirm the shape recognized as the image or to recognize the output position of the processed computer graphic image by the marker or the bar code.

The control unit 200 of the present invention is a computer device of the augmented reality maintenance apparatus 20. The control unit 200 outputs failure locations, failed components, and failure states on a screen of the augmented reality terminal 30 as augmented reality information by processing and analyzing the image and data input through the BWTS interface 100 and the augmented reality interface 300 according to the built-in software or algorithms.

The satellite communication interface 400 is a device for connecting the ship augmented reality maintenance apparatus 20 for the BWTS and the satellite communication device 40. A shown in FIG. 6, the satellite communication interface 400 may transmit and receive a signal from the control unit 200 to and from the remote management system 50 of the remote base station (terrestrial base station) through a satellite to share the image and data with respect to the remote terrestrial base station and the BWTS 10.

According to the present invention constituted as described above, the remote management system 50 reports the operation state of the BWTS 10 in a real-time manner.

A technical specialist of the terrestrial base station having a professional technology with respect to the BWTS 10 may output dealing with the failure as an image through the augmented reality terminal 30 at the time of failure of the BWTS 10 terrestrial base station.

That is, when the BWTS 10 fails, a ship operator, who is a BWTS non-expert, wears the augmented reality terminal 300 and enters the installation chamber of the BWTS 10, the control unit 200 analyzes the signal input through the BWTS interface to output the position and the state of the failed BWTS 10 as an image in the real-time manner. At the same time, the under of control of the terrestrial base station, a failure dealing method or a failure repair method is shown on the augmented reality terminal 30 as the image so that the non-expert on the sea may repair the failure of the BWTS 10 on behalf of the experts located at a remote land.

In particular, as shown in FIG. 3, when the augmented reality terminal 30 is used as the HUD, the ship operator views the BWTS 10 with eyes to recognize the failed position and state of the BWTS 10. Under the control of the land experts, the BWTS 10 may be repaired in the repair positions and method in accordance with the augmented reality information.

Therefore, the land experts can deal with the failure of the BWTS 10 as in the field, and the marine operator can deal with the failure of the BWTS 10 as a technician.

On the other hand, if the control unit 200 stores a failure processing manual with respect to various sensing signals input from the BWTS 10, when the failure of the BWTS is not failure which advices of the land experts particularly need, the control unit 200 may directly receive guide of the failure processing method of the BWTS 10 as image information of augmented reality information through the augmented reality terminal 30.

In addition, the remote management system of the terrestrial base station according to the present invention includes a program for diagnosing the status information of the BWTS transmitted through the satellite communication network to determine whether the BWTS is normal and to diagnose and predict the failure of the BWTS, and monitors the state information of the BWTS in a real-time manner, and outputs a maintenance operation command of the BWTS when the maintenance command of the BWTS is generated or the failure of the BWTS is expected, so that the marine non-expert mounts the augmented reality terminal 30 and simply visits a installation room of the BWTS to perform the maintenance operation of the BWTS.

Various example embodiments will be described more fully hereinafter with reference to the accompanying drawings, in which some example embodiments are shown. The present inventive concept may, however, be embodied in many different forms and should not be construed as limited to the example embodiments set forth herein.

Although embodiments have been described with reference to a number of illustrative embodiments thereof, it should be understood that numerous other modifications and embodiments can be devised by those skilled in the art that will fall within the spirit and scope of the principles of this disclosure.

What is claimed is:

1. A remote managed ballast water treatment system using augmented reality, a ballast water treatment system (hereinafter, referred to as "BWTS") which receives operation and failure information from various sensors installed in each component within a device, the remote managed ballast water treatment system comprising;

an augmented reality terminal having a software application installed therein, which can recognize each component of the BWTS through shape information in a shot image while shooting a real-time image and provides information on a state of the BWTS and information required for the BWTS (provides augmented reality information), through a computer graphic image, in addition to a real-time image of reality;

an augmented reality maintenance apparatus for the BWTS, the apparatus comprising a BWTS interface, an augmented reality interface, a satellite communication interface, and a control unit; wherein the BWTS interface which receives operation and failure information of the BWTS from various sensors installed in the BWTS; the augmented reality interface which receives real-time image information from the augmented reality terminal or outputs the real-time image information to the augmented reality terminal; the satellite communication interface connected to an external satellite communication device to perform transmission/reception with a remote terrestrial base station; and the control unit which calculates information input through the BWTS interface, the augmented reality interface, and the satellite communication interface to output the calculated information, wherein the calculated information is displayed on a screen of the augmented reality terminal; and a remote management system of a terrestrial base station which shares sensing information of the BWTS and real-time image information of the augmented reality terminal with satellite communication through the satellite communication interface, wherein, when BWTS maintenance information has been sent from the remote management system of the terrestrial base station during a BWTS failure, the control unit outputs a failure point and repair information as augmented reality image information to the augmented reality terminal, a failure treatment method is guided to a user as a real-time augmented reality image, and the terrestrial base station supervises a failure treatment process of the BWTS through a real-time image.

2. The remote managed ballast water treatment system of claim 1, wherein a marker or a bar code is attached to each part of the BWTS that the augmented reality terminal recognizes while photographing a real-time image, and the augmented reality terminal recognizes shapes of the parts of the BWTS and an output position of a processed computer graphic image by the marker or the bar code.

3. The remote managed ballast water treatment system of claim 2, wherein the augmented reality terminal comprises a smart phone or a head up device (HUD) including a software application for additionally providing a computer graphic virtual image to a real-time image of a real environment.

4. The remote managed ballast water treatment system of claim 1, wherein the control unit comprises a memory for storing a failure processing manual with respect to various sensing signals input from the BWTS as augmented reality image information and guides general failure processing of the BWTS to be soon realized as augmented reality.

5. The remote managed ballast water treatment system of claim 1, wherein the remote management system of the terrestrial base station comprises a program for diagnosing state information of the BWTS received from a satellite network to determine whether or not the remote management system is normal and to diagnose and estimate a failure of the BWTS to monitor the state information of the BWTS in real time, and outputs a maintenance command of the BWTS or a maintenance operation command of the BWTS when the failure of the BWTS is estimated through an augmented reality interface.

\* \* \* \* \*